(12) United States Patent
Lu et al.

(10) Patent No.: US 10,178,588 B2
(45) Date of Patent: *Jan. 8, 2019

(54) WIRELESS DEVICE, NETWORK NODES AND METHODS THEREIN FOR HANDLING A DEVICE-TO-DEVICE (D2D) COMMUNICATION DURING HANDOVER IN A WIRELESS TELECOMMUNICATIONS NETWORK

(71) Applicant: Telefonaktiebolaget LM Ericsson (publ), Stockholm (SE)

(72) Inventors: Qianxi Lu, Beijing (CN); Qingyu Miao, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 84 days.

This patent is subject to a terminal disclaimer.

(21) Appl. No.: 15/240,633

(22) Filed: Aug. 18, 2016

(65) Prior Publication Data
US 2016/0360449 A1    Dec. 8, 2016

Related U.S. Application Data

(63) Continuation of application No. 14/408,504, filed as application No. PCT/SE2013/050553 on May 16, 2013, now Pat. No. 9,445,316.

(51) Int. Cl.
*H04B 7/00* (2006.01)
*H04W 36/00* (2009.01)
(Continued)

(52) U.S. Cl.
CPC ....... *H04W 36/0055* (2013.01); *H04W 76/23* (2018.02); *H04W 72/1289* (2013.01); *H04W 74/0833* (2013.01); *H04W 84/22* (2013.01)

(58) Field of Classification Search
CPC .......... H04W 36/0055; H04W 76/043; H04W 72/1289; H04W 84/22; H04W 36/0083; H04W 36/0088
(Continued)

(56) References Cited

U.S. PATENT DOCUMENTS 7,286,841 B2 * 10/2007 Sun .................... H04B 7/2681
370/278
7,831,252 B2 * 11/2010 Shang .................. H04W 36/30
370/331
(Continued)

FOREIGN PATENT DOCUMENTS

CN          1622677 A      6/2005
CN        101689936 A      3/2010
(Continued)

*Primary Examiner* — Dmitry Levitan
(74) *Attorney, Agent, or Firm* — Murphy, Bilak & Homiller, PLLC

(57) ABSTRACT

A method performed by a first wireless device for handling a device-to-device (D2D) communication with a second wireless device during handover of the first wireless device from a source network node to a target network node in a wireless telecommunications network is provided. The first wireless device interrupts the D2D communication. Then, the first wireless device determines a first uplink timing difference as the difference between the uplink timing to the source network node and the uplink timing to the target network node. Further, the first wireless device reconfigures the D2D communication based on the first uplink timing difference. Then, the first wireless device restarts the D2D communication as reconfigured. A first wireless device is also provided, along with a target network node, a source network node and methods therein for handling a D2D communication.

14 Claims, 10 Drawing Sheets

(51) Int. Cl.
*H04W 76/23* (2018.01)
*H04W 84/22* (2009.01)
*H04W 72/12* (2009.01)
*H04W 74/08* (2009.01)

(58) Field of Classification Search
USPC .................. 370/310, 328, 331, 464, 465
See application file for complete search history.

(56) References Cited

U.S. PATENT DOCUMENTS

| | | | |
|---|---|---|---|
| 8,504,052 B2 | 8/2013 | Hakola et al. | |
| 8,929,339 B2 * | 1/2015 | Park | H04W 36/0033 370/331 |
| 9,049,002 B2 | 6/2015 | Kazmi et al. | |
| 2007/0115884 A1 | 5/2007 | Shang et al. | |
| 2011/0275382 A1 | 11/2011 | Hakola et al. | |
| 2013/0058311 A1 | 3/2013 | Park et al. | |
| 2013/0102314 A1 | 4/2013 | Koskela et al. | |
| 2014/0016574 A1 | 1/2014 | Seo et al. | |
| 2014/0098753 A1 | 4/2014 | Kazmi et al. | |
| 2014/0226629 A1 | 8/2014 | Kim et al. | |
| 2015/0063317 A1 | 3/2015 | Park et al. | |
| 2015/0110209 A1 | 4/2015 | Zhou | |
| 2015/0146687 A1 | 5/2015 | Kim et al. | |
| 2015/0195865 A1 | 7/2015 | Lee | |
| 2015/0334693 A1 | 11/2015 | Lu et al. | |

FOREIGN PATENT DOCUMENTS

| | | |
|---|---|---|
| JP | 2006522534 A | 9/2006 |
| JP | 2007512752 A | 5/2007 |
| KR | 1020120067621 A | 6/2012 |
| RU | 2011142449 A | 4/2013 |
| WO | 2011109027 A1 | 9/2011 |
| WO | 2012157941 A2 | 11/2012 |

* cited by examiner

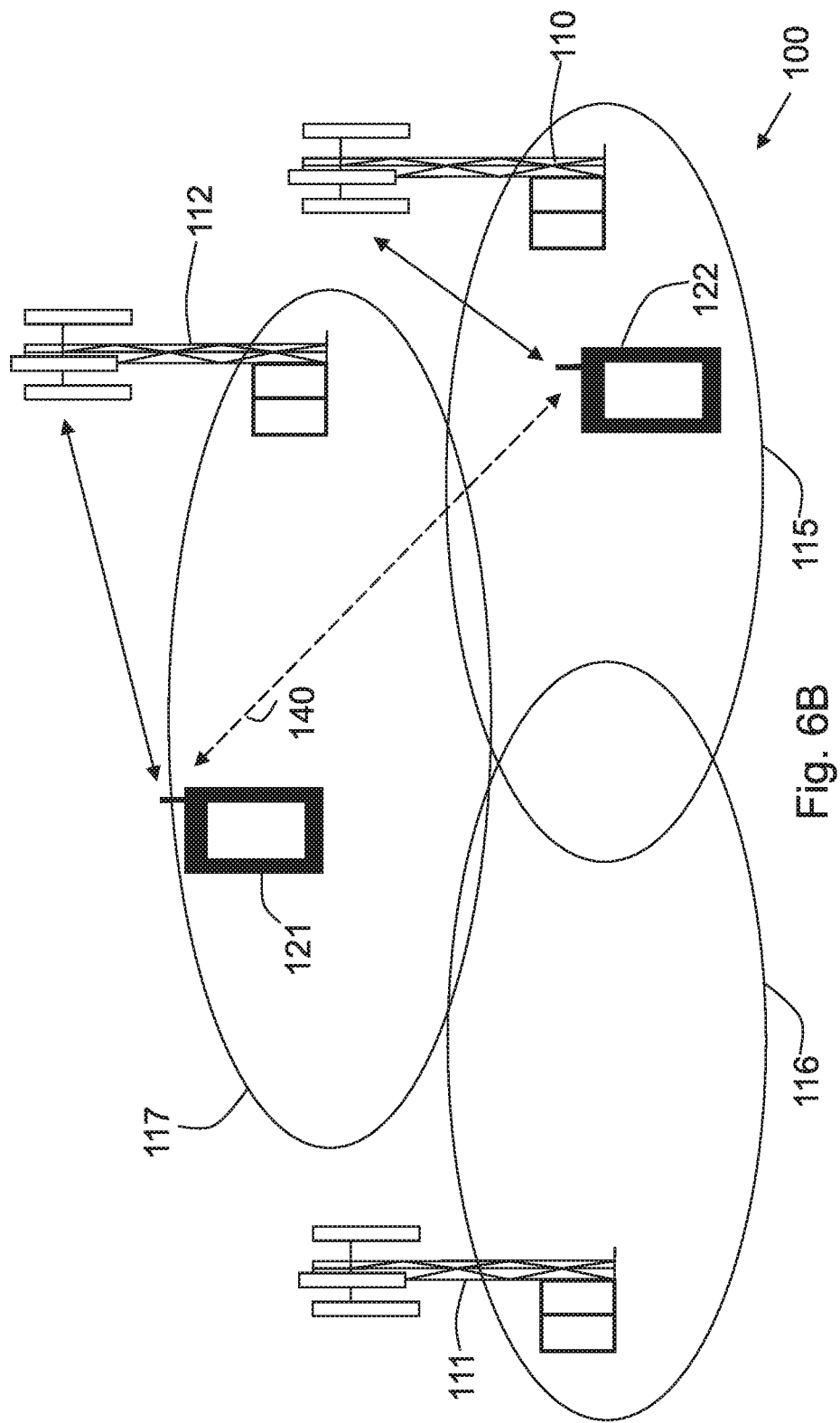

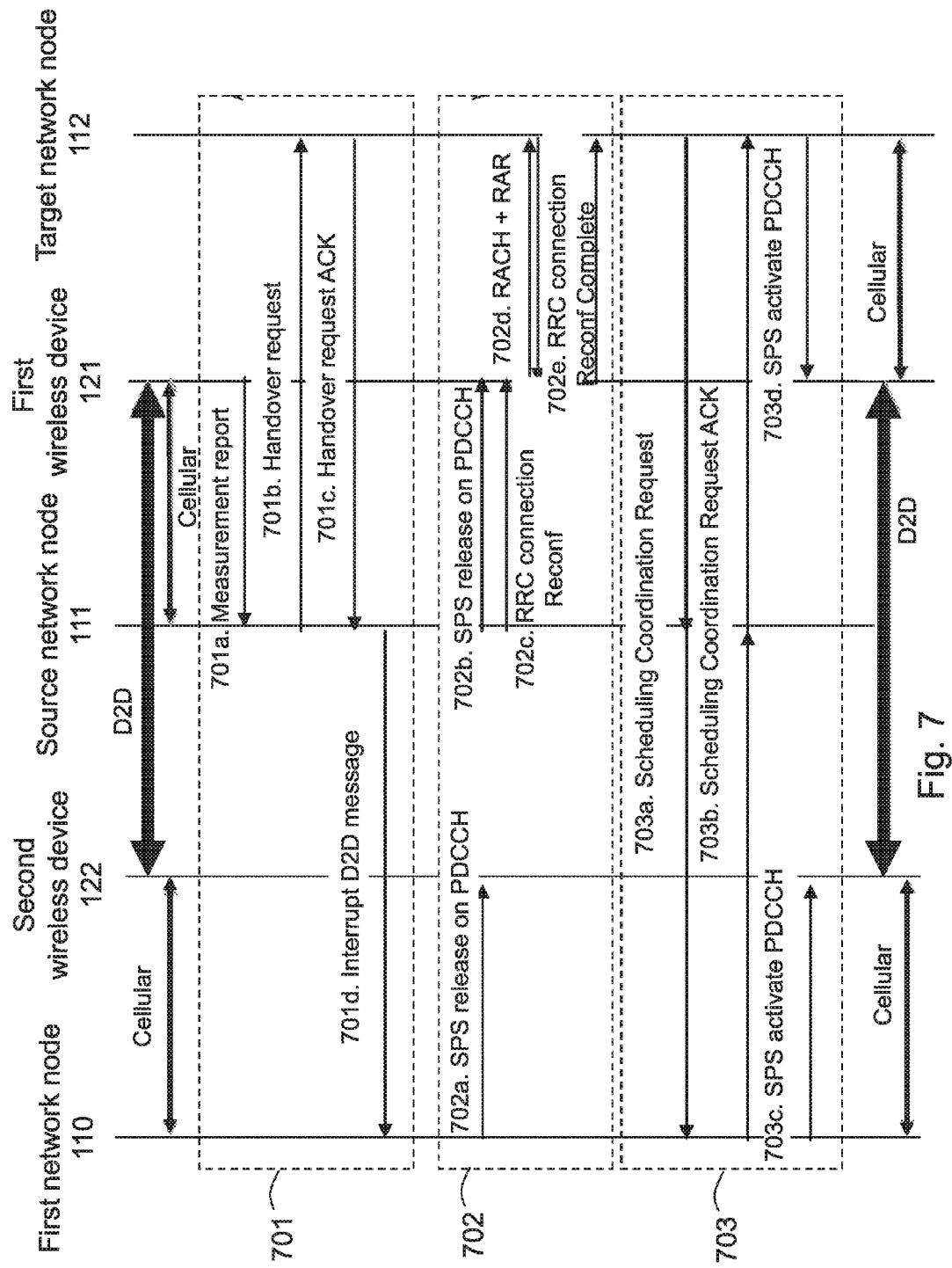

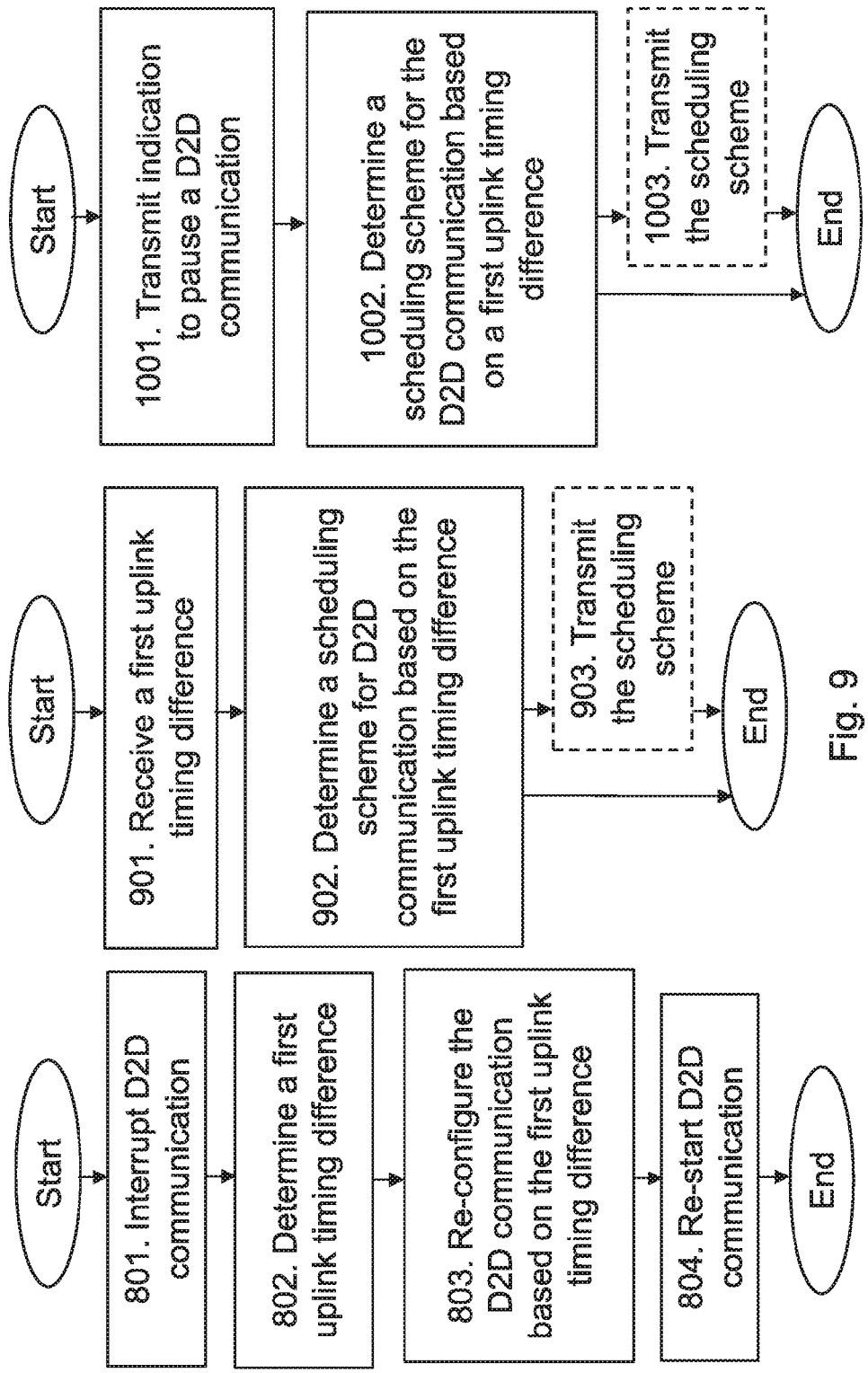

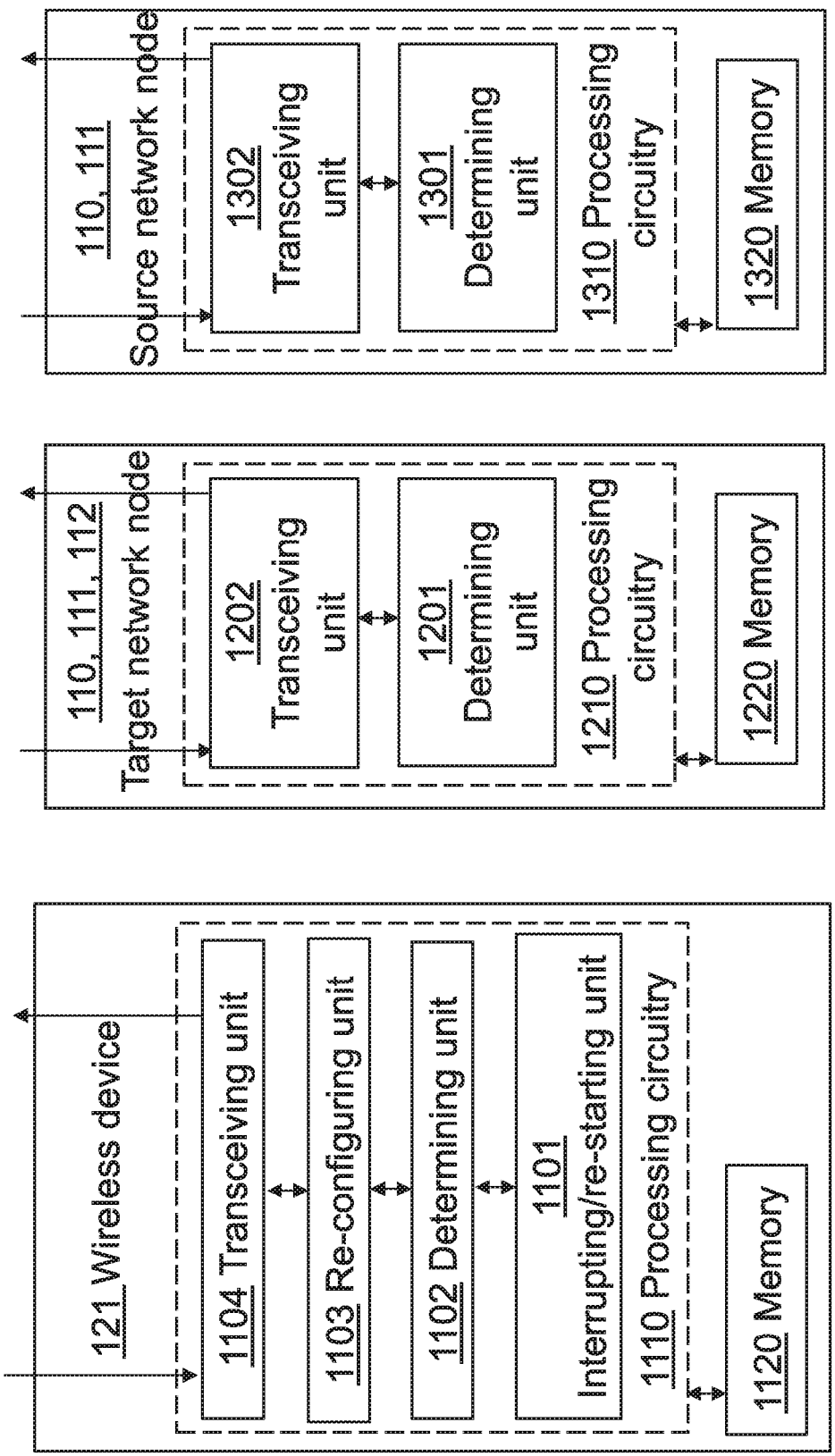

WIRELESS DEVICE, NETWORK NODES AND METHODS THEREIN FOR HANDLING A DEVICE-TO-DEVICE (D2D) COMMUNICATION DURING HANDOVER IN A WIRELESS TELECOMMUNICATIONS NETWORK

RELATED APPLICATIONS

This application is a continuation of co-pending U.S. patent application Ser. No. 14/408,504, filed 16 Dec. 2014, which is a national stage entry under 35 U.S.C. § 371 of international patent application serial no. PCT/SE2013/050553 filed 16 May 2013. The entire contents of each of the aforementioned applications is incorporated herein by reference.

TECHNICAL FIELD

Embodiments herein relate to Device-to-Device (D2D) communications in a wireless telecommunications network. In particular, embodiments herein relate to handling a D2D-communication during handover of a wireless device in a wireless telecommunications network.

BACKGROUND

In wireless communication networks, recent developments of the 3GPP Long Term Evolution, LTE, facilitate accessing local IP based services in the home, the office, in public hot spot or even in outdoor environments. One area in which the access and local connectivity of these local IP based services may be used is in the direct communication between wireless devices in the close proximity of each other. In this case, close proximity may typically refer to less than a few tens of meters, but sometimes even up to a few hundred meters.

This direct mode or Device-to-Device, D2D, communication may demonstrate a number of potential gains over traditional cellular communication. This is because D2D devices are much closer to one another than other cellular devices that have to communicate via a cellular access point, e.g. a radio network node such as an eNodeB.

However, it should be noted that it is preferable to maintain the control of the D2D communication from a network point of view in order to ensure an efficient use of resources and interference handling.

In these mixed cellular and D2D wireless communication networks, it has been suggested to locate D2D communication on cellular uplink, UL, resources in a way such that Time-Division Duplex, TDD, is the duplex transmission scheme of the D2D communication. This means that the cellular UL resources would be allocated for D2D communication transmission in both upstream and downstream directions between each D2D pair of wireless devices in a Time-Division Multiplexed, TDM, manner.

Once the wireless devices discover the proximity of each other, the wireless devices and/or the network may initiate the establishment of the D2D link between the two wireless devices. This is commonly referred to as D2D bearer establishment, and will not be discussed further herein.

However, upon having established the D2D link between the two wireless devices, there is a problem of how to handle the D2D communication when one of the wireless devices is moving out of the cellular coverage of its current cell and into the cellular coverage of another cell, i.e. during a handover. Thus, there is a need to provide way of handling a D2D communication during handover of wireless device in a wireless communications network.

WO2011/109027 A1 describes a handover of a D2D pair of wireless devices between different cells. However, in this case, both of the wireless devices of the D2D pair are part of the handover and the network control of the D2D communication may simply pass from network node of the source cell to the network node of the target cell.

SUMMARY

It is an object of embodiments herein to provide way of handling a D2D communication during handover of wireless device in a wireless communications network.

According to a first aspect of embodiments herein, the object is achieved by a method performed by a first wireless device for handling a device-to-device, D2D, communication with a second wireless device during handover of the first wireless device from a source network node target network node in a wireless telecommunications network. The first wireless device interrupts the D2D communication. Then, the first wireless device determines a first uplink timing difference as the difference between the uplink timing to the source network node and the uplink timing to the target network node. Further, the first wireless device reconfigures the D2D communication based on the first uplink timing difference. Then, the first wireless device restarts the D2D communication as reconfigured.

According to a second aspect of embodiments herein, the object is achieved by a first wireless device for handling a D2D communication with a second wireless device during handover of the first wireless device from a source network node to a target network node in a wireless telecommunications network. The first wireless device comprises processing circuitry configured to first interrupt the D2D communication. The processing circuitry is configured to then determine a first uplink timing difference as the difference between the uplink tinning the source network node and the uplink tinning to the tan-let network node. Further, the processing circuitry is configured to reconfigure the D2D communication based on the first uplink tinning difference, and restart the D2D communication as reconfigured.

According to a third aspect of embodiments herein, the object is achieved by a method performed by a target network node for handling a D2D communication between a first wireless device and a second wireless device during handling of the first wireless device to the target network node from a source network node in a wireless telecommunications network. The target network node, after completing the handover, receives at least a first uplink timing difference of the first wireless device from the first wireless device. Also, the target network node determines a scheduling scheme for the D2D communication based on at least the first uplink timing difference of the first wireless device, which first uplink timing difference is the difference between the uplink timing of the first wireless device to the source network node and the uplink timing of the first wireless device to the target network node.

According to a fourth aspect of embodiments herein, the object is achieved by a target network node for handling a D2D communication between a first wireless device and a second wireless device during handover of the first wireless device to the target network node from a source network node in a wireless telecommunications network. The target network node comprises processing circuitry configured to, after completing the handover, receive at least a first uplink timing difference of the first wireless device from the first wireless device. The processing circuitry is further configured to determine a scheduling scheme for the D2D communication based on at least the first uplink timing difference of the first wireless device, which first uplink timing difference is the difference between the uplink timing of the first wireless device to the source network node and the uplink timing of the first wireless device to the target network node.

According to a fifth aspect of embodiments herein, the object is achieved by a method performed by a source network node for handling a D2D communication between a first wireless device and a second wireless device during handover of the first wireless device from the source network node to a target network node in a wireless telecommunications network. The source network node transmits an indication to interrupt the D2D communication to at least the second wireless device before the handover is initiated. Then, after completing the handover, the source network node determines a scheduling scheme for the D2D communication based on at least first uplink timing difference of the first wireless device, which first uplink timing difference is the difference between the uplink timing of the first wireless device to the source network node and the uplink timing of the first wireless device to the target network node.

According to a sixth aspect of embodiments herein, the object is achieved by a source network node for handling a D2D communication between a first wireless device and a second wireless device during handover of the first wireless device from the source network node to a target network node in a wireless telecommunications network. The source network node comprising processing circuitry configured to transmit an indication to interrupt the D2D communication to at least the second wireless device before the handover is initiated. The processing circuitry is further configured to determine, after completing the handover, a scheduling scheme for the D2D communication based on at least a first uplink timing difference of the first wireless device, which first uplink timing difference is the difference between the uplink timing of the first wireless device to the source network node and the uplink timing of the first wireless device to the target network node.

By having wireless devices that are engaged in D2D communication providing, to a network node, uplink timing differences between a source network node and the tar network node when performing a handover from the source network node to the target network node, the network nodes involved in controlling the D2D communication may determine a scheduling scheme for the D2D communication to be used after the handover is completed. That is, based on the uplink timing differences, the network nodes may reach an agreement on the time locations that are to be used for the scheduling of the D2D communication. This scheduling scheme will thus efficiently avoid collisions when having a split network control point, i.e. two network nodes controlling the D2D communication, which is scheduling resources for the cellular and D2D links. Hence, a way of handling a D2D communication during handover of wireless device in a wireless communications network is provided.

BRIEF DESCRIPTION OF THE DRAWINGS

Features and advantages of the embodiments will become readily apparel to those skilled in the art by the following detailed description of exemplary embodiments thereof with reference to the accompanying drawings, wherein:

FIG. 6A-6B are schematic block diagrams illustrating a third D2D handover scenario according to some embodiments.

FIG. 7 is a schematic signaling diagram depicting signaling according to some embodiments in the third D2D handover scenario of FIG. 6.

FIG. 8 is a flowchart depicting embodiments of a method in wireless device.

FIG. 9 is a flowchart depicting embodiments of a method in target network node.

FIG. 10 is a flowchart depicting embodiments of a method in source network node.

FIG. 11 is a block diagram depicting embodiments of a wireless device.

FIG. 12 is a block diagram depicting embodiments of a target network node.

FIG. 13 is a block diagram depicting embodiments of a source network node.

DETAILED DESCRIPTION

Figure 1:
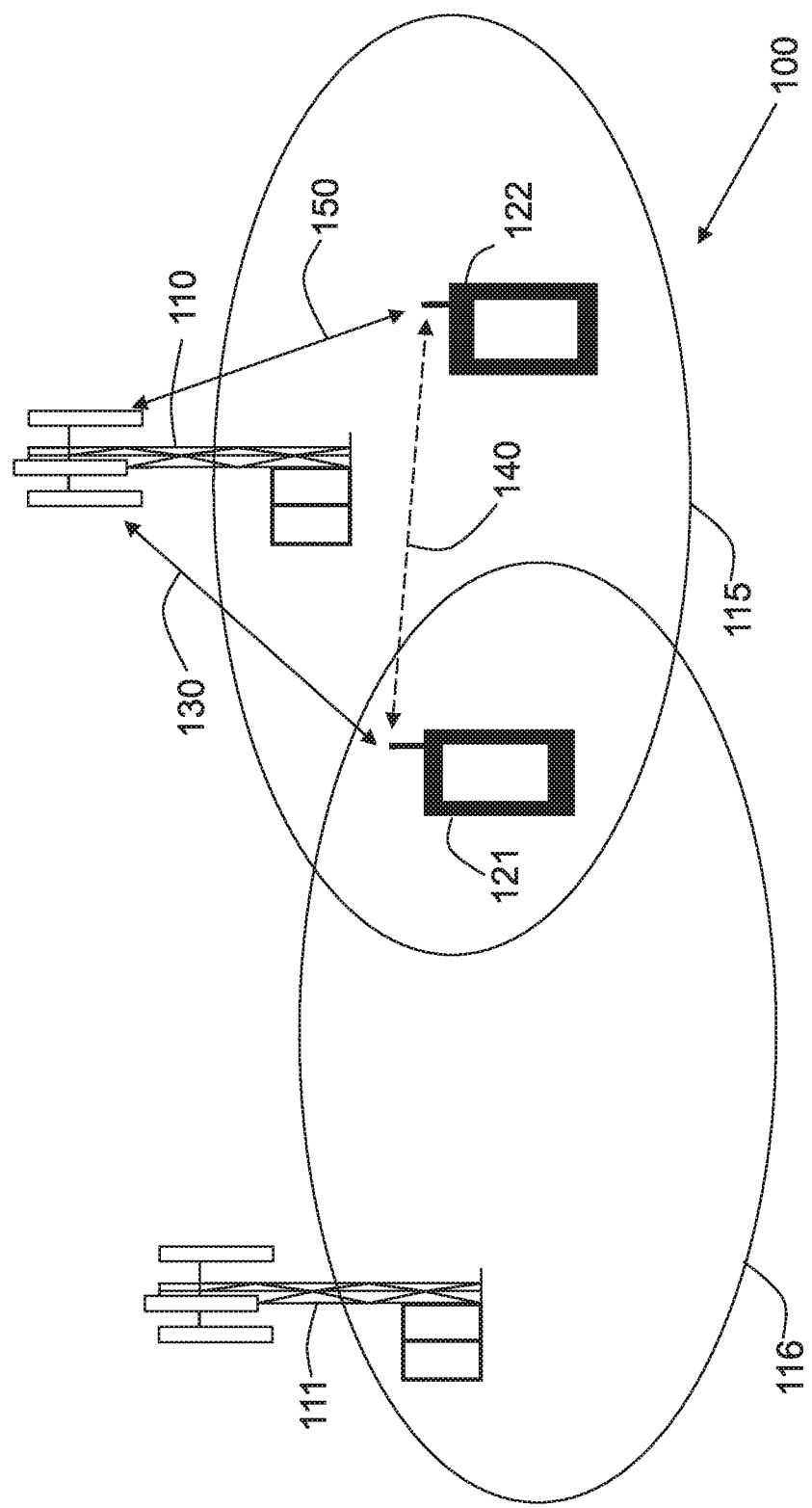
FIG. 1 is a schematic block diagram illustrating embodiments in a wireless communications network.
Figure 2:
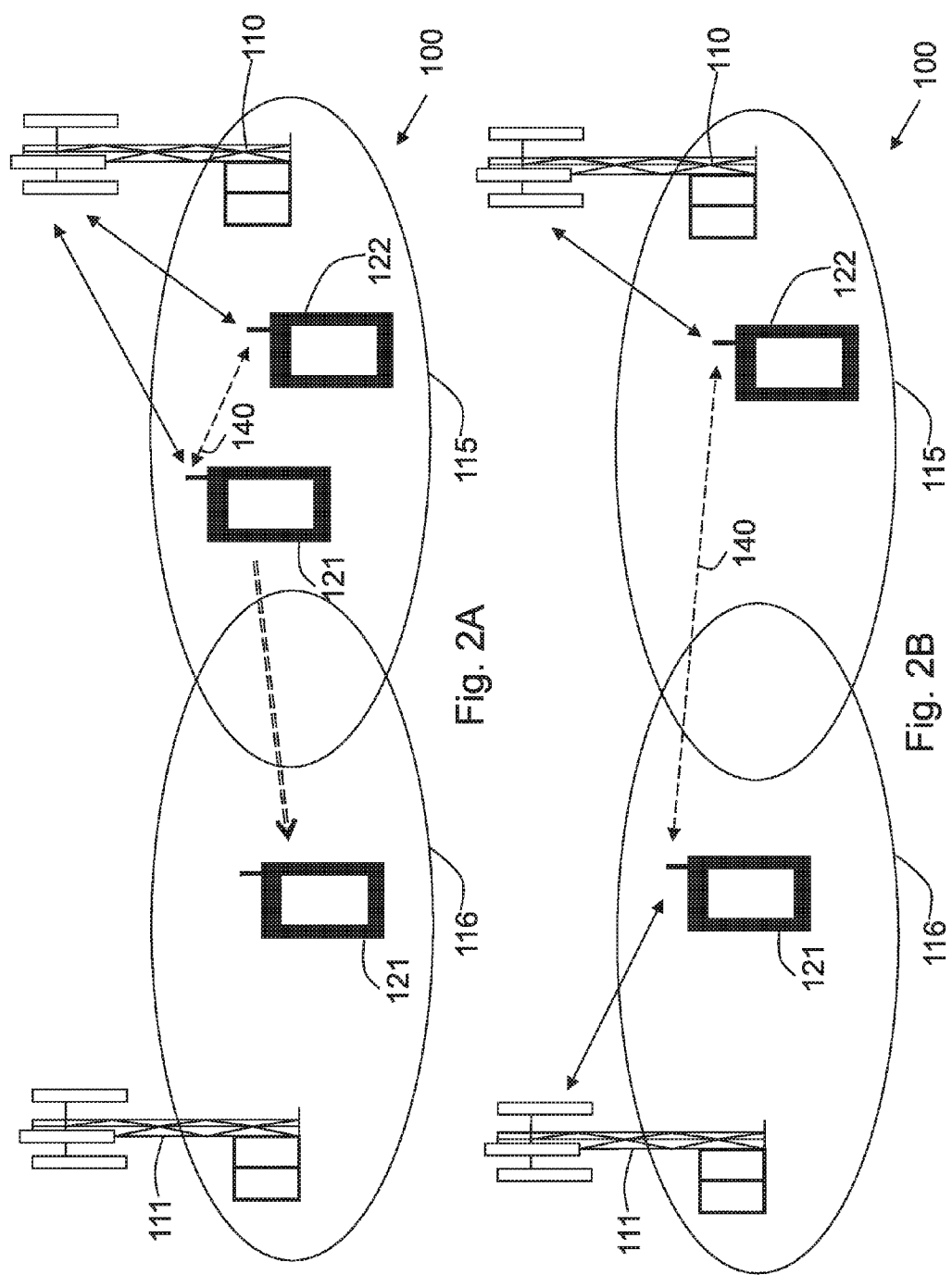
FIG. 2A-2B are schematic block diagrams illustrating a first D2D handover scenario according to some embodiments.

The figures are schematic and simplified for clarity, and they merely show details which are essential to the understanding of the embodiments presented herein, while other details have been left out. Throughout, the same reference numerals are used for identical or corresponding parts or steps.

FIG. 1 depicts a wireless telecommunications network 100 in which embodiments herein may be implemented. In some embodiments the wireless telecommunications network 100 may be a wireless telecommunication network such as an LTE (e.g. LTE FDD, LTE TDD, LTE HD-FDD), WCDMA, UTRA TDD, GSM network, GERAN network, enhanced data rate for GSM evolution (EDGE) network, network comprising of any combination of RATs such as e.g. Multi-Standard Radio (MSR) base stations, multi-RAT base stations etc., any 3GPP cellular network, Wimax, or any cellular network or system.

The wireless telecommunications system 100 comprises a first radio network node 110 which is a radio base station and may therefore also be referred to as a radio base station or base station. The network node 110 serves a first cell 115. The network node 110 may in this example e.g. be an eNB, eNodeB, or a Home Node B, a Home eNode B, femto Base Station (BS), pico BS or any other network unit capable to serve a wireless device or a machine type communication device in a wireless telecommunications system, e.g. a device such as a cluster head.

A first wireless device 121 is located within the first cell 115. The wireless device 121 is configured to communicate within the wireless communications system 100 via the radio network node 110 over a radio link 130 when present in the first cell 115 served by the radio network node 110. The first wireless device 121 is capable of communicating with other wireless devices, such as, a second wireless device 122 to be described below using wireless D2D communication, over a D2D link 140 (dashed arrow in FIG. 1).

In this example, a second wireless device 122 is also located within the first cell 115. However, in other embodiments, the second wireless device 122 may be located in another cell, such as, e.g. second cell 115 served by another second radio network node 111, which is adjacent to the first cell 115. The second wireless device is configured to communicate within the wireless communications system 100 via the first radio network node 110 over a radio link such as e.g. a radio link 150 when present in the first cell 115 served by the base station 110. The second wireless device 122 is capable of communicating with other wireless devices such as the first wireless device 121 using wireless D2D communication over the D2D link 140.

It should be noted that the first wireless device 121 and the second wireless device 122 may e.g. be wireless devices, e.g. be mobile terminals or wireless terminals, mobile phones, computers such as e.g. laptops, Personal Digital Assistants (PDAs) or tablet computers with wireless capability, Machine to Machine (M2M) devices or any other radio network units capable to communicate over a radio link in a communications network.

It should also be noted that a large number of wireless devices may be located in the communications network 100. The first and second wireless device 121, 122 may be seen as one D2D pair of wireless devices among many more D2D pairs of wireless devices located in the communications network 100.

However, when one of the wireless devices, e.g. the first wireless device 121, is moving out of the cellular coverage of the first cell 115 and into the cellular coverage of another cell, e.g. the second cell 115, the first radio network node 110 may no longer be able to control the scheduling of the D2D communication if a handover is subsequently performed of the first wireless device 121 to the second radio network node 111.

Thus, in this case, the network control point of the D2D communication between the wireless devices would need to be split between the first and the second radio network nodes 110, 111. Here, avoiding collisions, i.e. where the first radio network node schedules for the D2D communication and the second radio network node schedules for cellular communication, when having a split network control point scheduling resources for the cellular and D2D becomes a problem. This problem will appear for both synchronized and unsynchronized neighboring cells. For the unsynchronized case, there is also a problem in that the cell timing is different for the two cells and unknown to the D2D pair of wireless devices, i.e. the D2D pair of wireless devices is one transmitting/receiving pair of devices whereby the D2D communication between these wireless devices should be synchronized.

This issue is addressed by embodiments described herein by having the wireless devices 121, 122 that are engaged in a D2D communication providing uplink timing differences between the uplink timing to a source network node, i.e. the network node of their respective current cell, and the uplink timing to a target network node, i.e. the network node of the cell they are moving into, when performing a handover from the source network node to the target network node. Thus, the network nodes involved in controlling the D2D communication may determine a scheduling scheme for the D2D communication to be used after the handover is completed. That is, based on the uplink timing differences, the network nodes may reach an agreement on the time locations that are to be used for the scheduling of the D2D communication. This scheduling scheme will thus efficiently avoid collisions when having a split network control point that are scheduling resources for the cellular and D2D link. Hence, a way of handling a D2D communication during handover of wireless device in a wireless communications network is provided.

Below, three different D2D handover scenarios are described in more detail with reference to FIGS. 2-7, which illustrate the different handover situations that are handled by the embodiments presented herein for D2D communications. Thereafter, the embodiments are also further described in reference to FIGS. 8-13.

FIGS. 2A-2B shows a first D2D handover scenario according to so embodiments. In FIG. 2A, the first wireless device 121 is engaged in a D2D communication with the second wireless device 122 over the D2D link 140. In this first D2D handover scenario, the first wireless device 121 then starts to move out of the cellular coverage of its current cell, i.e. the first cell 115 served by the first network node 110, and into the cellular coverage of the second cell 115 served by the second network node 111 (as shown by the dashed, double lined arrow). The first network node 110 may in this scenario be referred to as the source network node, and the second network node 111 referred to as the target network node. This may trigger the signaling of embodiments described in detail below with reference to FIG. 3.

Figure 3:
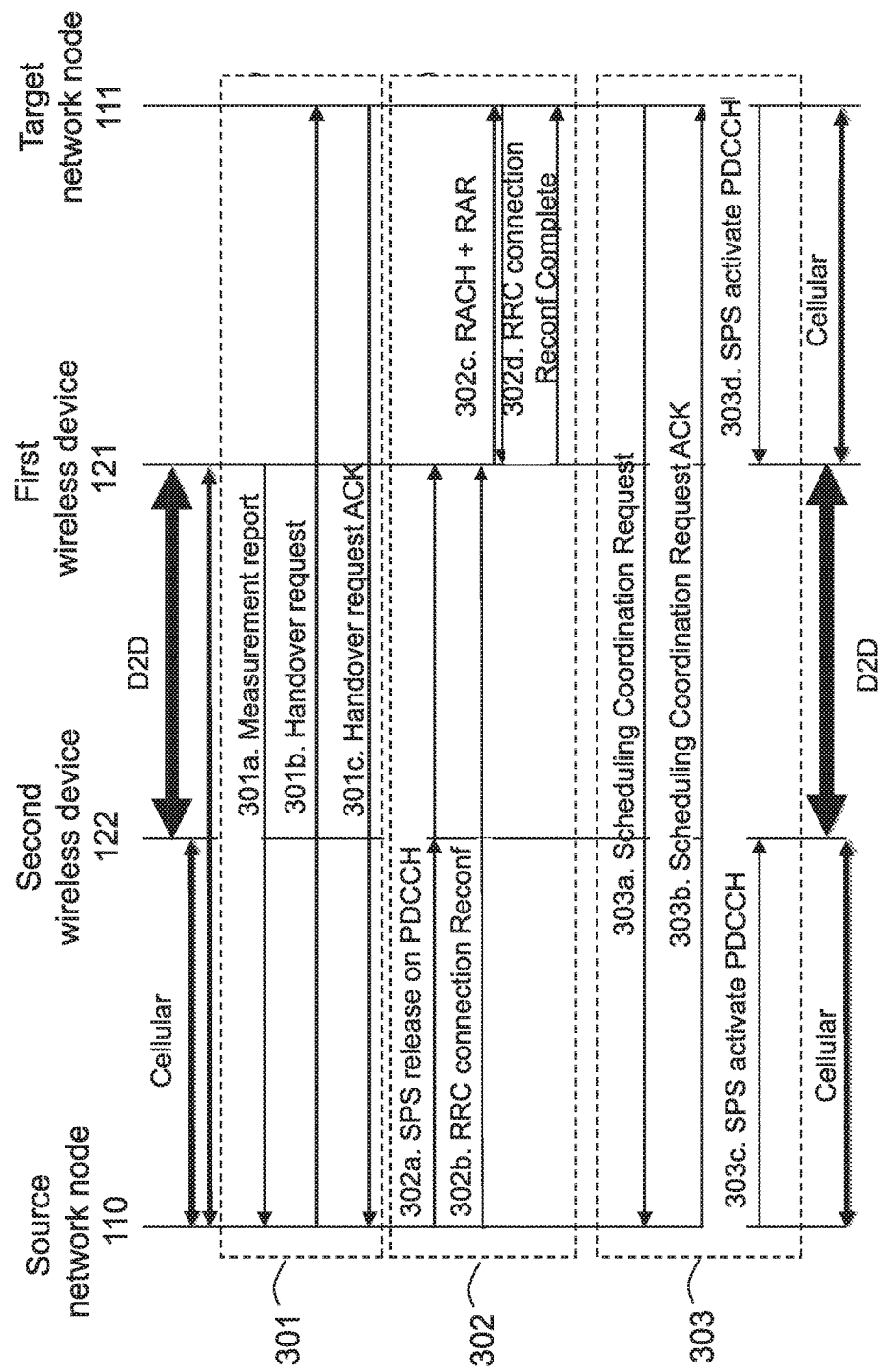
FIG. 3 is a schematic signaling diagram depicting signaling according to some embodiments in the first D2D handover scenario of FIG. 2.
Figure 4:
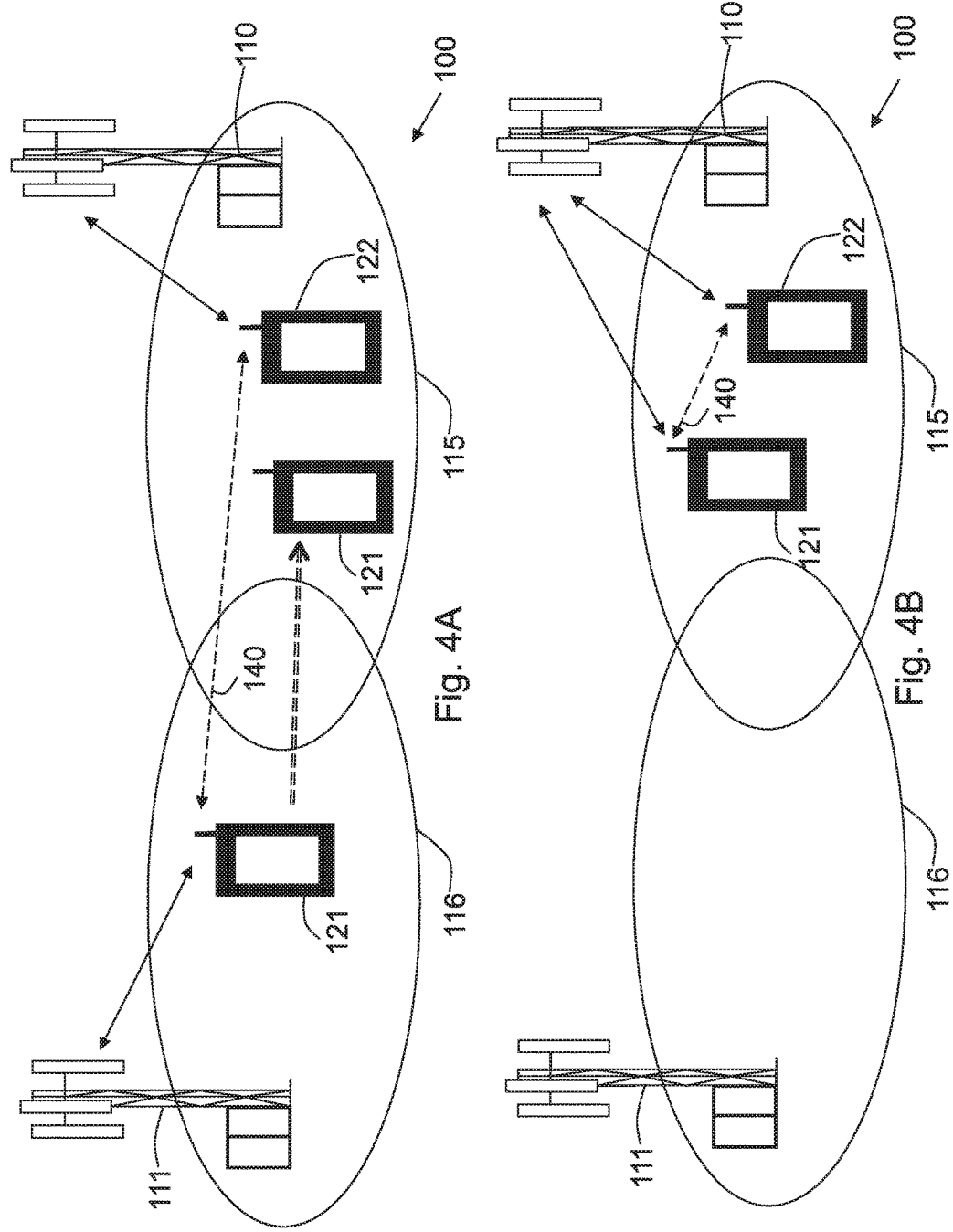
FIG. 4A-4B are schematic block diagrams illustrating a second D2D handover scenario according to some embodiments.

As shown in FIG. 2B, once this signaling of FIG. 3 has been completed, the first wireless 121 will have performed a handover from the first network node 110 to the second network node 111. This means that the first wireless device 121 is now located in the second cell 115 and is being served by the second network node 111. As a consequence of the signaling of FIG. 3, the first wireless device 121 will also still be engaged in the D2D communication with the second wireless device 122 over the D2D link 140, where the second wireless device 122 is still located in the first cell 115 and being served by the first network node 110.

FIG. 3 shows signaling of some embodiments triggered by the first D2D handover scenario shown in FIG. 2A. The signaling may be described by three main signaling blocks: a D2D handover preparation stage 301, a D2D handover execution stage 302, and a D2D scheduling stage 303.

As shown in FIG. 3, prior to the signaling, the first wireless device 121 is engaged in a D2D communication with the second wireless device 122 over a D2D link. The first and second wireless device 121, 122 have each also an established cellular link with the first network node 110, i.e. the source network node 110. In this example, the source network node 110 and the target network node 111 are not synchronized with each other.

In the D2D handover preparation stage 301, a conventional wireless device measurement report by the first wireless device 121 may trigger the handover procedure for both the source network node 110 and the target network node 111.

Action 301a. The first wireless device 121 may transmit a measurement report to the source network node 110. The measurement report may be based on the determined information elements, MeasConfig and ReportConfig Radio Resource Control, RRC, Information Element, IE). These IEs may have been transmitted to the first and second wireless device 121, 122 by the source network node 110 beforehand.

Upon receiving the measurement report from the first wireless device 121, the source network node 110 is notified that the first wireless device 121, which is engaged in a D2D communication with the second wireless device 122, in ends to change serving cell, i.e. move out of the coverage area of the source network node 110 and into the coverage area of the target network node 111.

Action 301b. In response to the measurement report, the source network node 110 sends a handover request to the target network node 111 via an X2 interface. Here, the source network node 110 may add, in the handover request, the information that the first wireless device 121 is a D2D-capable wireless device and that there is an ongoing D2D communication related to the first wireless device 121. This allows the target network node 111 to decide whether to accept the first wireless device 121 based on the target network node's 111 capabilities, e.g. whether it can handle a D2D communication or not, and current network load.

Action 301c. In response to the handover request, the target network node 111 may send a handover request acknowledgement, ACK, to the source network node 110. This handover request ACK indicates to the source network node 110 that the target network node 111 is ready to accept the handover of the first wireless device 121. In some embodiments, the IE MobilityCortrolInfo may be piggy-backed on this signaling. This would otherwise be sent to the first wireless device 121 later for access to the target network node 111.

Next, the D2D handover execution stage 302, by command from the source network node 110, the first wireless device 121 may switch serving network node to the target network node 111. In this stage, according to some embodiments, the main task of the first wireless device 121 is to measure and report the uplink timing difference between the source network node 110 and the target network node 111 during the handover. The uplink timing difference is here the difference between the uplink timing to the source network node 110 and the uplink timing to the target network node 111.

Action 302a. The source network node 110 may here transmit a message indicating to the first and second wireless device 121, 122 that the D2D communication should be interrupted before the handover is initiated. In response to receiving this message, the first and second wireless device 121, 122 may interrupt or temporarily pause the D2D communication between the first and second wireless device 121, 122.

However, it should be noted that if the D2D communication is based on dynamic scheduling, which is performed on a short-time-scale, such as, e.g. per Transmission-Time-Interval, i.e. 1 ms, there is here no need for an independent signaling to stop the D2D communication. The source network node 110 may simply stop scheduling the D2D communication. On the other hand, if the D2D communication is based on Semi-Persistent Scheduling, SPS, which is performed on a large-time-scale, such as, e.g. about 100~500 ms, it may be necessary to temporarily interrupt or temporarily pause the SPS.

In some embodiments, the message may be a Semi-Persistent Scheduling Release on PDCCH message. This may be sent to and received by the first and second wireless device 121, 122 in order to release the resources, e.g. by using a shared Radio Network Temporary Identifier, RNTI, for the D2D communication, D2D_RNTI.

Action 302b. In this action, the source network node 110 may transmit a message to the first wireless device 121 indicating that the first wireless device 121 is to switch serving network node from the source network node 110 to the target network node 111, i.e. switch serving cell. Related information to perform the switch may be comprised in the message, e.g. as a MobilityControlInfo IE, received by the source network node 110 from the target network node 111. According to some embodiments, this message may also indicate the first wireless device 121 to perform measurements of the uplink timing to the source and target network nodes 110, 111, and report the uplink timing difference between the source and target network nodes 110, 111. The message may e.g. be a RRC connection Reconfiguration message.

Action 302c. Through a contention-free or contention-based Random Access CHannel, RACH, procedure with the target network node 111, the first wireless device 121 may acquire the uplink timing of the target network node 111 via a Random Access Response, RAR, message from the target network node 111. The first wireless device 121 may then compare the uplink timing of the target network node 111 with the uplink timing of the source network node 110, and thus determine the uplink timing difference between the source and target network nodes 110, 111.

It should be noted that the content of this uplink timing difference can be various. For coordination of the scheduling between the source and target network node 110, 111, it may be enough to acquire the uplink timing difference in the order of number of subframes.

However, e.g. for inter-cell peer discovery or for interference coordination, the accuracy of the uplink timing difference may have to be at a level of more accurate granularity, e.g. at a level of symbol, sample, etc. Thus, the embodiments herein should not be construed as being limited to a specific quantification scheme of the uplink timing difference.

Action 302d. In this action, the first wireless device 121 may send a message indicating a successful handover to the first wireless device 121 to the target network node 111. This message may also comprise the determined uplink timing difference between the source and target network nodes 110, 111, and thus the determined uplink timing difference may be reported to the target network node 111. The message may e.g. be a RRC connection Reconfiguration Complete message.

In the D2D scheduling stage 303, the source and target network nodes 110, 111 may negotiate the scheduling scheme for the D2D communication, i.e. in which subframes transmission resources should be allocated for the D2D communication, based on e.g. the time partition between current cellular and D2D communication mode and the cell timing of the source and target network nodes 110, 111, respectively. The resulting D2D scheduling scheme is then sent to both the first and second wireless devices 121, 122 to re-start D2D communication again. It should also be noted that this procedure is applicable for both synchronized and unsynchronized cells.

Action 303a-303b. In these actions, the source and target network nodes 110, 111 may send inter-cell coordination messages via an X2 interface between each other. The messages may e.g be a Scheduling Coordination Request messages and Scheduling Coordination Request ACK messages. The source and target network nodes 110, 111 needs to reach an agreement about the time locations of the subframes to be used for the D2D communication. Otherwise, the source network node 110 may schedule a subframe for the D2D communication while the target network node 11 schedules the same subframe for cellular communication, which would cause a scheduling collision.

It should also be noted that the content of the X2 signaling between the source and target network nodes 110, 111 may be various. For example, it could be a numerical or binary value for each subframe, such as, e.g. 0 for a cellular subframe, 1 for a D2D subframe. According to another example, more information may be comprised therein, e.g. value 2 for a negotiable subframe. This may be advantageous since the source network node 110 may have its own preference on the subframe allocation for the D2D communication.

Furthermore, the procedure of this negotiation may be various. It may e.g be triggered by the source network node 110 or the target network node 11, and accepted/rejected by the other. Other, negotiation procedures can also be envisioned.

Action 303c-303d. When a D2D scheduling scheme has been agreed upon by the source and target network nodes 110, 111, source and target network nodes 110, 111 may send the D2D scheduling scheme to the second and first wireless device 121, 122, respectively. This may be performed via an SPS procedure, e.g. SPS activation PDCCH messages may be used by the source and target network nodes 110, 111.

In response to receiving the D2D scheduling scheme, the first and second wireless device 121, 122 may re-start the D2D communication based on the received D2D scheduling scheme. Also, subsequently, the first and second wireless device 121, 122 may then, based on the TDD configuration of the D2D bearer, decide on further matters of the D2D communication, such as, e.g. resource location, HARQ timing and etc.

It should be noted that the term "re-started" used throughout the embodiments herein is to be interpreted as continuing the D2D communication from the point in time where it was interrupted.

FIGS. 4A-4B shows a second D2D handover scenario according to some embodiments. In FIG. 4A, the first wireless device 121 is engaged in a D2D communication with the second wireless device 122 over the D2D link 140. The first wireless device 122 is here located in a different cell than the second wireless device 122, i.e. in second cell 116 served by the second network node 111. This situation may occur, for example, as a consequence of the first scenario described above.

In this second D2D handover scenario, the first wireless device 121 then starts to move out of the cellular coverage of its current cell, i.e. the second cell 116 served by the second network node 111, and into the cellular coverage of the first cell 115 served by the first network node 110 (as shown by the dashed, double lined arrow). This means that the first wireless device 121 moves into the cell of the second wireless device 122.

The second network node 111 may in this scenario be referred to as the source network node, and the first network node 110 referred to as the target network node. This may trigger the signaling of embodiments described in detail below with reference to FIG. 5.

Figure 5:
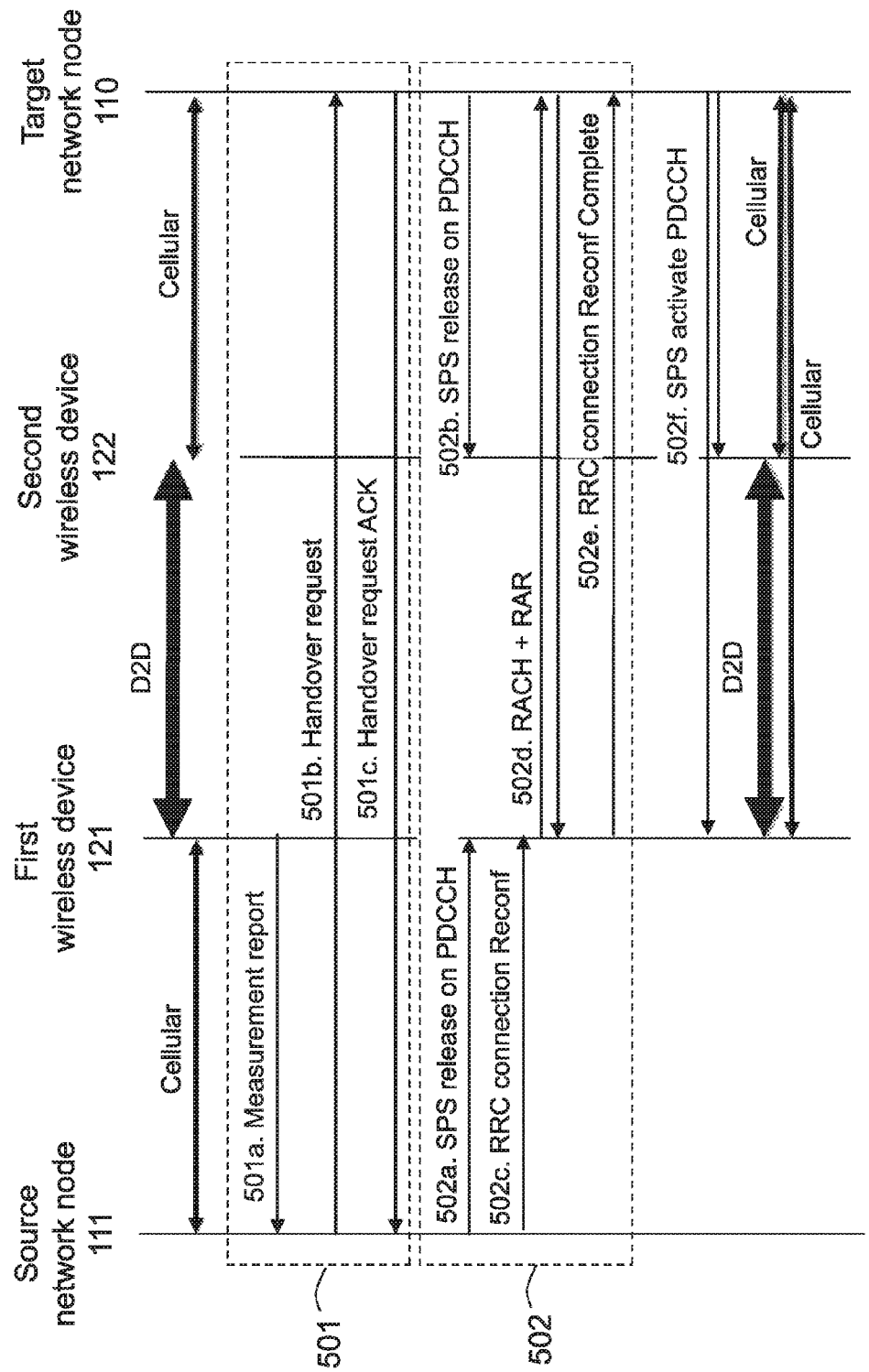
FIG. 5 is a schematic signaling diagram depicting signaling according to some embodiments in the second D2D handover scenario of FIG. 4.

As shown in FIG. 4B, once this signaling of FIG. 5 has been completed, the first wireless 121 will have performed a handover from the second network node 111 to the first network node 110. This means that the first wireless device 121 is then located in the first cell 115 and is being served by the first network node 110. As a consequence of the signaling of FIG. 5, the first wireless device 121 will also have maintained the D2D communication with the second wireless device 122 over the D2D link 140. Since both the first and the second wireless device 121, 122 are now located in the same cell, i.e. the first cell 115, the first network node 110 will now form a single network control point of the D2D communication and may schedule the D2D communication.

FIG. 5 shows signaling of some embodiments triggered by the second D2D handover scenario shown in FIG. 4A.

The signaling may be described by two main signaling blocks: a D2D handover preparation stage 501 and a D2D handover stage 502.

As shown in FIG. 5, prior to the signaling, the first wireless device 121 is engaged in a D2D communication with the second wireless device 122 over a D2D link within two different cells. The first and second wireless device 121, 122 have each also an established cellular link with the second and first network node 111, 110, respectively, i.e. the source and target network node. In this example, the source network node 111 and the target network node 110 are not synchronized with each other.

In the D2D handover preparation stage 501, a conventional wireless device measurement report by the first wireless device 121 may trigger the handover procedure for both the source network node 111 and the target network node 110.

Action 501a. The first wireless device 121 transmits a measurement report to the source network node 111. Upon receiving the measurement report from the first wireless device 121, the source network node 111 is notified that the first wireless device 121, which is engaged in a D2D communication with the second wireless device 122, intends to change serving cell, i.e. move out of the coverage area of the source network node 111 and into the coverage area of the target network node 110.

Action 501b. In response to the measurement report, the source network node 111 sends a handover request to the target network node 110 via an X2 interface. Here, the source network node 111 may add, in the handover request, the information that first wireless device 121 is a D2D-capable wireless device.

Action 501c. In response to the handover request, the target network node 110 may send a handover request acknowledgement, ACK, to the source network node 111. This handover request ACK indicates to the source network node 111 that the target network node 110 is ready to accept the handover of the first wireless device 121.

Next, in the D2D handover execution stage 502, by command from the source network node 111, the first wireless device 121 may switch serving network node to the target network node 110. In this second scenario, however, there is no need for the first wireless device 121 to measure and report any uplink timing difference since it moves into the same cell as the second wireless device 122 and into the control of the same network node. This means that there is no longer any uplink timing difference because of both wireless devices are being served by the same network node.

Action 502a. The source network node 111 may transmit a message indicating to the first wireless device 121 that the D2D communication should be interrupted before the handover is initiated. In response to receiving this message, the first wireless device 121 may interrupt or temporarily pause the D2D communication between the first and second wireless device 121, 122.

Action 502b. The target network node 110 may transmit a message indicating the second wireless device 122 that the D2D communication should be interrupted before the handover is initiated. In response to receiving this message, the second wireless device 122 may interrupt or temporarily pause the D2D communication between the first and second wireless device 121, 122.

Action 502c. In this action, the source network node 111 may transmit a message to the first wireless device 121 indicating that the first wireless device 121 is to switch serving network node from the source network node 111 to the target network node 110, i.e. switch serving cell. The message may e.g. be a RRC connection Reconfiguration message.

Action 502*d*. In this action, the first wireless device 121 may perform a contention-free or contention-based Random Access CHannel, RACH, procedure with the target network node 110 without the need to acquire any uplink timing.

Action 502*e*. In this action, the first wireless device 121 may send a message indicating a successful handover of the first wireless device 121 to the target network node 110. The message may e.g. be a RRC connection Reconfiguration Complete message.

Action 502*f*. Now, the target network node 110 may determine the scheduling scheme for the D2D communication. The resulting D2D scheduling scheme is then sent to the first and second wireless devices 121, 122 to re-start D2D communication again. This may be performed via a SPS procedure. Then based on the TDD configuration of the D2D bearer, the first and second wireless devices 121, 122 may decide the resource location, HARQ timing, etc. for the D2D communication.

Figure 6A:
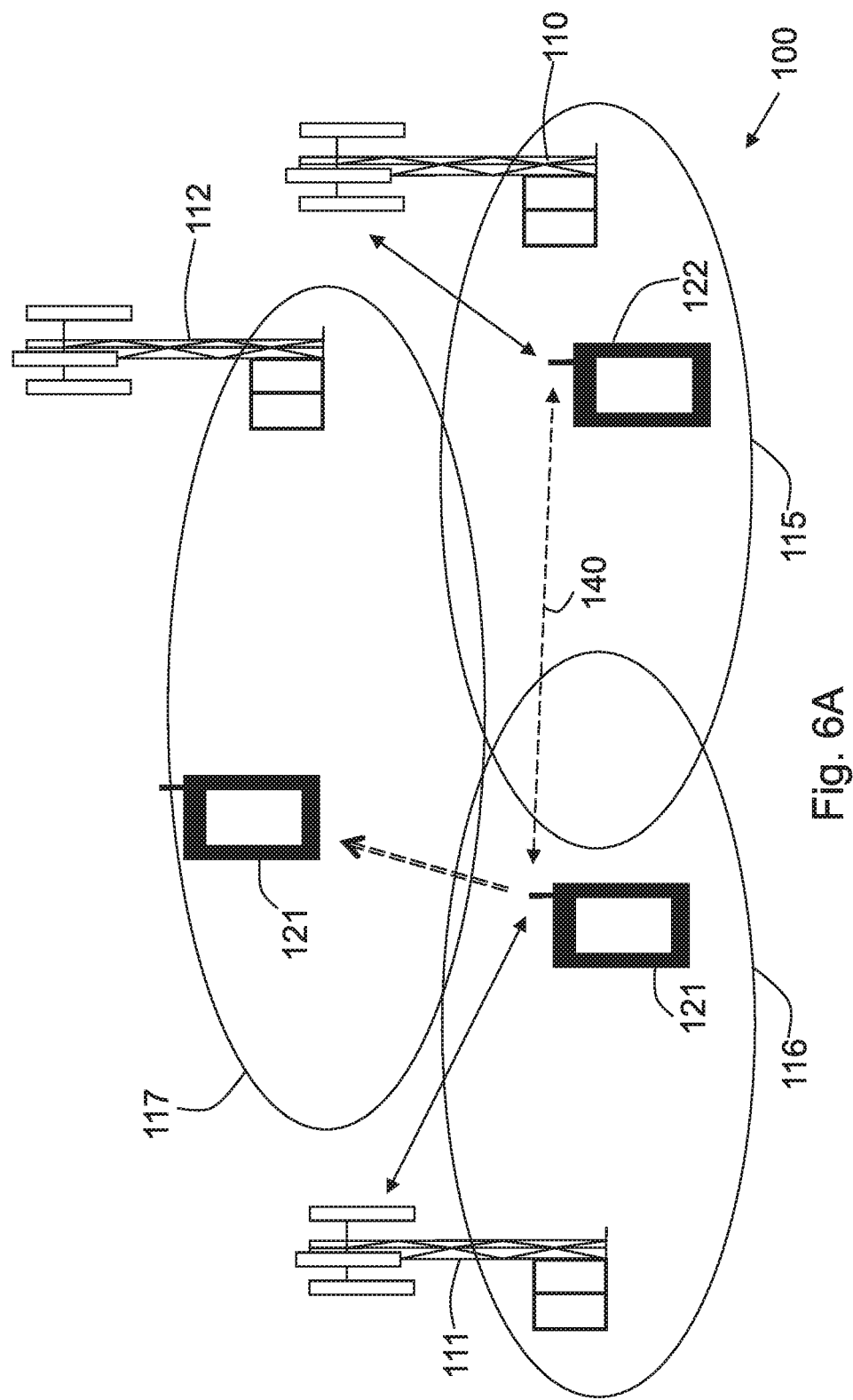

FIGS. 6A-6B shows a third D2D handover scenario according to some embodiments, in FIG. 6A, the first wireless device 121 is engaged in a D2D communication the second wireless device 122 over the D2D link 140. The first wireless device 121 is also in this case located in a different cell than the second wireless device 122, i.e. in second cell 116 served by the second network node 110. This situation may for example occur as a consequence of the first scenario described above.

In this third D2D handover scenario, the first wireless device 121 then starts to move out of the cellular coverage of its current cell, i.e. the second cell 116 served by the second network node 111, and into the cellular coverage of a third cell 117 served by a third network node 112 (as shown by the dashed, double lined arrow). The second network node 111 may in this scenario be referred to as the source network node, and the third network node 112 referred to as the target network node. This may trigger the signaling of embodiments described in detail below with reference to FIG. 7.

As shown in FIG. 6B, once this signaling of FIG. 7 has been completed, the first wireless 121 will have performed a handover from the second network node 111 to the third network node 111.

This means that the first wireless device 121 is then located in the third cell 117 and is being served by the third network node 112. As a consequence of the signaling of FIG. 7, the first wireless device 121 will also have maintained the D2D communication with the second wireless device 122 over the D2D link 140, where the second wireless device 122 is still located in the first cell 115 and being served by the first network node 110.

FIG. 7 shows signaling of some embodiments triggered by the third D2D handover scenario shown in FIG. 6A. The signaling may be described by three main signaling blocks: a D2D handover preparation stage 601, a D2D handover execution stage 602, and a D2D scheduling stage 603.

As shown in FIG. 7, prior to the signaling, the first wireless device 121 is engaged in a D2D communication with the second wireless device 122 over a D2D link between two different cells, i.e. the second and first cell 116, 115, respectively. The first and second wireless device 121, 122 have each also an established cellular link with the second and first network node 111, 110, respectively. In this example, the network nodes involved, i.e. the first, second and third network node, are not synchronized with each other.

In the D2D handover preparation stage 701, a conventional wireless device measurement report by the first wireless device 121 may trigger the handover procedure for the source network node 111, the target network node 112 and the first network node 110.

Action 701*a*. The first wireless device 121 may transmit a measurement report to the source network node 111. Upon receiving the measurement report from the first wireless device 121, the source network node 111 is notified that the first wireless device 121, which is engaged in a D2D communication with the second wireless device 122 in cell 115, intends to change serving cell, i.e. move out of the coverage area of the source network node 111 and into the coverage area of the target network node 112.

Action 701*b*. In response to the measurement report, the source network node 111 sends a handover request to the target network node 112 via an X2 interface. Here, the source network node 111 may add, in the handover request, the information that first wireless device 121 is a D2D-capable wireless device and that there is an ongoing D2D communication related to the first wireless device 121. This allows the target network node 112 to decide whether to accept the first wireless device 121 based on the target network node's 112 capabilities, e.g. whether it can handle a D2D communication or not, and current network load.

Action 701*c*. In response to the handover request, the target network node 112 may send a handover request acknowledgement, ACK, to the source network node 111. This handover request ACK indicates to the source network node 111 that the target network node 112 is ready to accept the handover of the first wireless device 121. In some embodiments, the IE MobilityControlInfo may be piggybacked on this signaling. This would otherwise be sent to the first wireless device 121 later for access to the target network node 112.

Action 701*d*. Further, in this action, the source network node 111 may also send a message to the first network node 110 indicating a temporary release of the D2D resources for the D2D communication, i.e. indicating to the first network node 110 that the D2D communication should be interrupted or temporarily paused. This is performed before the handover of the first wireless device 121 is initiated.

Next, in the D2D handover execution stage 702, by command from the source network node 111, the first wireless device 121 may switch serving network node to the target network node 112. In this stage, according to some embodiments, the main task of the first wireless device 121 is to measure and report the uplink timing difference between the source network node 111 and the target network node 112 during the handover. The uplink timing difference is here the difference between the uplink timing to the source network node 111 and the uplink timing to the target network node 112.

Action 702*a*. In response to the message from the source network node 111 in Action 701*d*, the first network node 110 may send a message indicating to the second wireless device 122 that the D2D communication should be interrupted before the handover is initiated. In response to receiving this message, the second wireless device 122 may interrupt or temporarily pause the D2D communication between the first and second wireless device 121, 122.

Action 702*b*. The source network node 111 may transmit a message indicating to the first wireless device 121 that the D2D communication should be interrupted before the handover is initiated. In response to receiving this message, the first wireless device 121 may interrupt or temporarily pause the D2D communication between the first and second wireless device 121, 122. It should be noted that the D2D communication may be interrupted by the second wireless device 122 as in Action 702a, by the first wireless device 121 as described in this Action 702b, or by both the first and second wireless device 121, 122.

Action 702c. In this action, the network node 111 may transmit a message to the first wireless device 121 indicating that the first wireless device 121 is to switch serving network node from the source network node 111 to the target network node 112, i.e. switch serving cell. Related information to perform the switch may be comprised in the message, e.g. as a MobilityControlInfo IE, received by the source network node 111 from the target network node 112, e.g. via X2 signaling. According to some embodiments, this message may also indicate the first wireless device 121 to perform measurements of the uplink timing to the source and target network nodes 111, 112, and report the uplink timing difference between the source and target network nodes 111, 112. The message may e.g. be a RRC connection Reconfiguration message.

Action 702d. Through a contention-free or contention-based Random Access CHannel, RACH, procedure with the target network node 112, the first wireless device 121 may acquire the uplink timing of the target network node 112 via a Random Access Response, RAR, message from the target network node 112. The first wireless device 121 may then compare the uplink timing of the target network node 112 with the uplink timing of the source network node 111, and thus determine the uplink timing difference between the source and target network nodes 111, 112.

It should be noted that the content of this uplink timing difference can be various. For coordination of the scheduling between the source and the target network nodes 111, 112, it may be enough to acquire the uplink timing difference in the order of number of subframes.

Action 702e. In this action, the first wireless device 121 may send a message indicating a successful handover of the first wireless device 121 to the target network node 112. This message may also comprise the determined uplink timing difference between the source and network nodes 111, 112, and thus the determined uplink timing difference may be reported to the target network node 112. The message may e.g. be a RRC connection Reconfiguration Complete message.

In the D2D scheduling stage 703, the target network node 112 and the first network node 110 may negotiate the scheduling scheme for the D2D communication, i.e. in which subframes transmission resources should be allocated for the D2D communication. This may be based on e.g. the time partition between current cellular and D2D communication mode and the cell timing of the target and first network node 112, 110, respectively.

This negotiation rimy be performed via source network node 111, which may act as a bridge between the target network node 112 and the first network node 110. The resulting D2D scheduling scheme is then sent to both the first and second wireless devices 121, 122 to re-start D2D communication again by the respective network nodes. It should also be noted that this procedure is applicable for both synchronized and unsynchronized cells.

Action 703a-703b. In these actions, the target and first network node 112, 110 may send inter-cell coordination messages via an X2 interface between each other. This is performed via the source network node 111, which receives and sends the messages onwards to respective network node. The messages may e.g be a Scheduling Coordination Request messages and Scheduling Coordination Request ACK messages.

Here, it should be noted that here the target network node 112 may only be aware of the uplink timing difference between the source and the target network node 111, 112, but is blind to the uplink timing of the first network node 110. However, the source network node 111 is aware of the uplink timing difference between itself and the first network node 110. Hence, by conveying this information to the target network node 112, the target network node may determine the uplink timing difference between the target and the first network node 112, 110.

The target and first network node 112, 110 needs to reach an agreement on the time locations of the sublimates to be used for the D2D communication. Otherwise, a D2D scheduling collision may occur as previously described.

It should also be noted that the content of the X2 signaling between the target and first network node 112, 110 may be various. For example, it could be a binary value for each subframe, such as, 0 for a cellular subframe, 1 for a D2D subframe. According to another example, more information may be comprised therein, e.g. a value 2 for a negotiable subframe.

Furthermore, the procedure of this negotiation may be various. It may e.g be triggered by the target network node 112 or the first network node 110, and accepted or rejected by the other. According to another example, there may be a pre-negotiation procedure between the source and the target network node for acquiring the uplink timing differences, or some negotiation procedures between first network node 110 and the source network node 111 may be implemented. Further negotiation procedures may also be envisioned with the same result.

Action 703c-703d. When a D2D scheduling scheme has been agreed upon by the target and first network node 112, 110, the target and first network node 112, 110 may send the D2D scheduling scheme to the first and second wireless device 121, 122, respectively. This may be performed via an SPS procedure, e.g. SPS activation PDCCH messages may be used by the target and first network node 112, 110.

In response to receiving the D2D scheduling scheme, the first and second wireless device 121, 122 may re-start the D2D communication based on the received D2D scheduling scheme. Also, subsequently, the first and second wireless device 121, 122 may then, based on the TDD configuration of the D2D bearer, decide on further matters of the D2D communication, such as, e.g. resource location, HARQ timing and etc.

Example of embodiments of a method performed by a first wireless device 121 for handling a D2D communication with a second wireless device 122 during handover of the first wireless device 121 from a source network node 110, 111 to a target network node 111, 112 in a wireless telecommunications network 100, will now be described with reference to a flowchart depicted in FIG. 8.

Here, the method is discussed seen from the perspective of the first wireless device 121.

The method may comprise the following actions, which actions may taken in any suitable order.

Action 801. In this action, the first wireless device 121 interrupts the D2D communication. This may be performed in response to receiving an indication to interrupt the D2D communication from a source network nod before the handover is initiated. For example, as described above in Action 302a, 502a and 702b.

Action 802. In this action, the first wireless device 121 determines a first uplink timing difference as the difference between the uplink timing to the source network node and the uplink timing to the target network node.

In some embodiments, the first wireless device 121 may determine the uplink timing to the target network node as part of a random access procedure being performed between the first wireless device 121 and the target network node during the handover. The uplink timing differences may e.g. be determined in the order of number of subframes.

Action 803. Based on the first uplink timing difference, the first wireless device 121 reconfigures the D2D communication.

In some embodiments, this may be performed by the first wireless device 121 by transmitting the determined first uplink timing difference to the target network node after the handover has been completed. For example, as described above in Action 302d, 502e and 702e.

In some embodiments, this may be accompanied by the first wireless device 121 also transmitting a second uplink timing difference to the target network node. This may occur when a second uplink timing difference has been determined by the first wireless device 121 for the D2D communication, which second uplink timing difference is the difference between the uplink timing to the source network node and the uplink timing to a third network node. For example, as described above in Action 702e.

Then, in response, the first wireless device 121 may receive a scheduling scheme for the D2D communication from the target network node. The scheduling scheme here indicating time locations of subframes in which transmission resources may be allocated for the D2D communication. For example, as described above in Action 303d, 502f and 703d.

Action 804. In this action, the first wireless device 121 restarts the D2D communication as reconfigured in Action 803.

Example of embodiments of a method performed by a target network node for handling a D2D communication between a first wireless device 121 and a second wireless device 122 during handover of the first wireless device 121 to the target network node from a source network node in a wireless telecommunications network 100, will now be described with reference to a flowchart depicted in FIG. 9.

Here, the method is discussed seen from the perspective of the target network node. The target network node may here be the second radio network node 111 in the first D2D handover scenario shown and described above with reference to FIGS. 2-3, the first radio network node 110 in the second D2D handover scenario shown and described above with reference to FIGS. 4-5, or the third radio network node 112 in the third D2D handover scenario shown and described above with reference to FIGS. 6-7.

The method may comprise the following actions, which actions may be taken in any suitable order.

Action 901. In this action, the target network node, after completing the handover, receives at least a first uplink timing difference of the first wireless device 121 from the first wireless device 121. For example, as described above in Action 302d, 502e and 702e. In some embodiments, the target network node may also receive a second uplink timing difference of the first wireless device 121 from the first wireless device 121. For example, as described above in Action 702e.

Action 902. In this action, the target network node determines a scheduling scheme for the D2D communication based on at least the first uplink timing difference of the first wireless device 121. The first uplink timing difference is the difference between the uplink timing of the first wireless device 121 to the source network node and the uplink timing of the first wireless device 121 to the target network node.

In some embodiments, this may be performed by the target network node by determining, through communications with the source network node over an X2 interface, time locations of subframes in which transmission resources may be allocated for the D2D communication. For example, as described above in Action 303a-303b and Action 703a-703b.

In some embodiments, when the target network node has also received a second uplink timing difference of the first wireless device 121 from the first wireless device 121, this may be further performed by the target network node also based on the second uplink timing difference of the first wireless device 121. The second unlink timing difference of the first wireless device 121 may here be the difference between the uplink timing of the first wireless device 121 to the source network node and the uplink timing of the first wireless device 121 to the third network node. For example, as described above in Action 703a-703b.

In addition, the determining may also be performed by the target network node by communicating with the third network node, when the third network node is serving the second wireless device 121. For example, as described above in Action 703a-703b.

Action 903. In this action, the target network node may transmit the scheduling scheme of the D2D communication to the first wireless device 121. For example, as described above in Action 303d, 502f and 703d.

Example of embodiments of a method performed by a source network node for handling a D2D communication between a first wireless device 121 and a second wireless device 122 during handover of the first wireless device 121 from the source network node to a target network node in a wireless telecommunications network 100, will now be described with reference to a flowchart depicted in FIG. 10.

Here, the method is discussed seen from the perspective of the source network node. The source network node may here be the first radio network node 110 in the first and second D2D handover scenario shown and described above with reference to FIGS. 2-5, or the second radio network node 111 in the third D2D handover scenario shown and described above with reference to FIGS. 6-7.

The method may comprise the following actions, which actions may be taken in any suitable order.

Action 1001. In this action, the source network node transmits an indication to interrupt the D2D communication to at least the second wireless device 121, 122 before the handover is initiated. For example, as described above in Action 302a, 502a and 702b.

Action 1002. In this action, the source network node determines, after completing the handover, a scheduling scheme for the D2D communication based on at least a first uplink timing difference f the first wireless device. The first uplink timing difference is the difference between the uplink timing of the first wireless device 121 to the source network node and the uplink timing of the first wireless device 121 to the target network node.

In some embodiments, this may be performed by the target network node by determining, through communications with the target network node over an X2 interface, time locations of the subframes in which transmission resources may be allocated for the D2D communication. For example, as described above in Action 303a-303b and Action 703a-703b.

Action 1003. In this action, the source network node may transmit the scheduling scheme of the D2D communication to the second wireless device 122. For example, as described above in Action 303c and Action 703c.

To perform the method actions for handling a D2D communication with a second wireless device 122 during handover of the first wireless device 121 from a source network node to a target network node in a wireless telecommunications network 100, the first wireless device 121 may comprise the following arrangement depicted in FIG. 11.

FIG. 11 shows a schematic block diagram of embodiments of the first wireless device 121.

The first wireless device 121 comprises a processing unit 1110, which may also be referred to as processing circuitry or processor. The processing unit 1110 may comprise, or be configured to be connected to, an interrupting/re-starting unit 1101, a determining unit 1102, a re-configuring unit 1103, and a transceiving unit 1104.

The interrupting/re-starting unit 1101 may be configured to interrupt the D2D communication. In some embodiments, this may be performed in response to receiving an indication to interrupt the D2D communication from a source network node before the handover is initiated. Also, the interrupting/re-starting unit 1101 may also be configured to restart the D2D communication when it has been reconfigured.

The determining unit 1102 may be configured to determine a first uplink timing difference as the difference between the uplink timing to the source network node and the uplink timing to the target network node. In some embodiments, the transceiving unit 1104 may be configured to transmit the determined first uplink timing difference to the target network node after the handover has been completed. Then, in some embodiments, the transceiving unit 1104 may receive a scheduling scheme for the D2D communication from the target network node, which scheduling scheme indicates time locations of subframes in which transmission resources may be allocated for the D2D communication.

In some embodiments, the determining unit 1102 may also be configured to a second uplink timing difference has been determined by the first wireless device 121 for the D2D communication. In this case, the transceiving unit 1104 may be further configured to transmit a second uplink timing difference to the target network node. The second uplink timing difference is the difference between the uplink timing to the source network node and the uplink timing to a third network node.

The re-configuring unit 1103 is configured to reconfigure the D2D communication based on the first uplink timing difference.

The embodiments herein for handling a D2D communication in the first wireless device 121 may be implemented through one or more processors, such as the processing unit 1110 in the first wireless device 121 depicted in FIG. 11, together with computer program code for performing the functions and actions of the embodiments herein. The program code mentioned above may also be provided as a computer program product, for instance in the form of a data carrier carrying computer program code for performing the embodiments herein when being loaded into the first wireless device 121. The computer program code may e.g. be provided as pure program code in the wireless device 121 or on a server and downloaded to the wireless device 121.

The first wireless device 121 may further comprise a memory 1120 comprising one or more memory units. The memory 1120 may be arranged to be used to store data, such as, e.g. information regarding the one or more intervals at which the energy of the transmission bursts should be increased to the second energy level, to perform the methods herein when being executed in the first wireless device 121.

Those skilled in the art will also appreciate that the processing unit 1110 and the memory 1120 described above may refer to a combination of analog and digital circuits, and/or one or more processors configured with software and/or firmware, e.g. stored in a memory, that when executed by the one or more processors such as the processing unit 1110 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

To perform the method actions for handling a D2D communication between a first wireless device 121 and a second wireless device 122 during handover of the first wireless device 121 to the target network node from a source network node, the target network node may comprise the following arrangement depicted in FIG. 12.

FIG. 12 shows a schematic block diagram of embodiment of the target network node. The target network node may here be the second radio network node 111 in the first D2D handover scenario shown and described above with reference to FIGS. 2-3, the first radio network node 110 in the second D2D handover scenario shown and described above with reference to FIGS. 4-5, or the third radio network node 112 in the third D2D handover scenario shown and described above with reference to FIGS. 6-7.

The target network node comprises a processing unit 1210, which may also be referred to as processing circuitry. The processing unit 1210 in the target network node may comprise, or be configured to be connected to, a determining unit 1201 and a transceiving unit 1202.

The transceiving unit 1202 may be configured to receive least a first uplink timing difference of the first wireless device 121 from the first wireless device 121 after completing the handover. In some embodiments, the transceiving unit 1202 may be configured to transmit the scheduling scheme of the D2D communication to the first wireless device 121. In some embodiments, the transceiving unit 1202 may also be configured to receive a second uplink timing difference of the first wireless device 121 from the first wireless device 121.

The determining unit 1201 is configured to determine a scheduling scheme for the D2D communication based on at least the first uplink timing difference of the first wireless device 121. The first uplink timing difference is the difference between the uplink timing of the first wireless device 121 to the source network node and the uplink timing of the first wireless device 121 to the target network node. In some embodiments, the determining unit 1201 may be configured to determine the scheduling scheme by determining, through communications with the source network node over an X2 interface, time locations of subframes in which transmission resources may be allocated for the D2D communication.

In some embodiments, the determining unit 1201 may also be configured to determine the scheduling scheme further based on the second uplink timing difference of the first wireless device 121. The second uplink timing difference of the first wireless device 121 is here the difference between the uplink timing of the first wireless device 121 to the source network node and the uplink timing of the first wireless device 121 to the third network node. In some embodiments, the determining unit 1201 may also be configured to determine the scheduling scheme by communicating with a third network node, when the third network node is serving the second wireless device 122.

The embodiments herein for handling a D2D communication a target network node may be implemented through one or more processors, such as, the processing unit 1210 in the target network node depicted in FIG. 12, together with computer program code for performing the functions and actions of the embodiments herein. The program code mentioned above may also be provided as a computer program product, for instance in the form of a data carrier carrying computer program code for performing the embodiments herein when being loaded into the target network node. One such carrier may be in the form of a CD ROM disc. It is however feasible with other data carriers such as a memory stick. The computer program code may e.g. be provided as pure program code in the target network node or on a server and downloaded to target network node.

The target network node may further comprise a memory 1220 comprising one or more memory units. The memory 1220 may be arranged to be used to store data, such as, e.g. information regarding the one or more intervals at which the energy of the transmission bursts should be increased to the second energy level, to perform the methods herein when being executed in the target network node.

Those skilled in the art will also appreciate that the processing unit 1210 and the memory 1220 described above may refer to a combination of analog and digital circuits, and/or one or more processors configured with software and/or firmware, e.g. stored in a memory, that when executed by the one or more processors such as the processing unit 1210 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

To perform the method actions for handling a D2D communication between a first wireless device 121 and a second wireless device 122 during handover of the first wireless device 121 from a source network node to a target network node, the source network node may comprise the following arrangement depicted in FIG. 13.

FIG. 13 shows a schematic block diagram of embodiments of the source network node. The source network node may here be the first radio network node 110 in the first and second D2D handover scenario shown and described above with reference to FIGS. 2-5, or the second radio network node 111 in the third D2D handover scenario shown and described above with reference to FIGS. 6-7.

The target network node comprises a processing unit 1310, which may also be referred to as processing circuitry. The processing unit 1310 in the target network node may comprise, or be configured to be connected to, a determining unit 1301 and a transceiving unit 1302.

The transceiving unit 1202 may be configured to transmit an indication to interrupt the D2D communication to at least the second wireless device before the handover is initiated. In some embodiments, the transceiving unit 1202 may be configured to transmit the scheduling scheme of the D2D communication to the second wireless device 122.

The determining unit 1201 is configured to determine, after the handover is completed, a scheduling scheme for the D2D communication based on at least a first uplink timing difference of the first wireless device 121. The first uplink timing difference is the difference between the uplink timing of the first wireless device 121 to the source network node and the uplink timing of the first wireless device 121 to the target network node. In some embodiments, the determining unit 1201 may be configured to determine the scheduling scheme by determining, through communications with the target network node over an X2 interface, time locations of the subframes in which transmission resources may be allocated for the D2D communication.

The embodiments herein for handling a D2D communication in a source network node may be implemented through one or more processors, such as, the processing unit 1310 in the source network node depicted in FIG. 13, together with computer program code for performing the functions and actions of the embodiments herein. The program code mentioned above may also be provided as a computer program product, for instance in the form of a data carrier carrying computer program code for performing the embodiments herein when being loaded into the source network node. One such carrier may be in the form of a CD ROM disc. It is however feasible with other data carriers such as a memory stick. The computer program code may e.g. be provided as pure program code in the source network node or on a server and downloaded to source network node.

The source network node may further comprise a memory 1320 comprising one or more memory units. The memory 1320 may be arranged to be used to store data, such as, e.g. information regarding the one or more intervals at which the energy of the transmission bursts should be increased to the second energy level, to perform the methods herein when being executed in the source network node.

Those skilled in the art will also appreciate that the processing unit 1310 and the memory 1320 described above may refer to a combination of analog and digital circuits, and/or one or more processors configured with software and/or firmware, e.g. stored in a memory, that when executed by the one or more processors such as the processing unit 1310 perform as described above. One or more of these processors, as well as the other digital hardware, may be included a single application-specific integrated circuit (ASIC), or several processors and various digital hardware may be distributed among several separate components, whether individually packaged or assembled into a system-on-a-chip (SoC).

It should be noted that although the target network node and source network node are described as separate entities above for the sake of clarity, a network node may most commonly be implemented as capable of being both a target network node and a source network node depending on which of the first, second or third D2D handover scenario is current the case. Thus, in this case, the processing unit 1210 and the memory 1220 may be the same as the processing unit 1310 and the memory 1320.

The embodiments herein are not limited to the above described preferred embodiments. Various alternatives, modifications and equivalents may be used. Therefore, the above embodiments should not be construed as limiting.

What is claimed is:

1. A method performed by a first wireless communication device operating in a wireless telecommunication network having a plurality of nodes for serving wireless communication devices, the method comprising:
sending signaling to the network that initiates handover of the first wireless communication device from a current serving node to a new serving node;
pausing Device-to-Device (D2D) communication with a second wireless communication device operating in the network, in response to receiving handover-related signaling from the network, wherein the D2D communication uses uplink resources of the network according to resource scheduling by the network that depends on an uplink timing of the respective node or nodes serving the first and second wireless communication devices;

determining an uplink timing difference between the current and new serving nodes and reporting the uplink timing difference to the network, for use by the network in resuming scheduling of the D2D communication after handover; and resuming the D2D communication after handover, according to resumed scheduling by the network.

2. The method of claim 1, wherein sending the signaling to the network that initiates handover of the first wireless communication device from the current serving node to the new serving node comprises sending a measurement report indicating signal measurements made by the first wireless communication device with respect to the serving node and one or more further nodes neighboring the serving node.

3. The method of claim 1, wherein the resource scheduling by the network of the D2D communication is semi-persistent scheduling, and wherein pausing the D2D communication comprises pausing the D2D communication on semi-persistently granted resources, in response to receiving an indication from the serving node that the D2D communication should be paused.

4. The method of claim 1, further comprising determining the uplink timing of the new serving node based on performing a random access procedure with the new serving node.

5. The method of claim 1, wherein resuming the D2D communication after handover comprises receiving a scheduling scheme for the D2D communication from the new serving node, indicating time locations of subframes in which transmission resources may be allocated for the D2D communication, and resuming the D2D communication according to the received scheduling scheme.

6. The method of claim 5, wherein the transmitting further comprises transmitting a further uplink timing difference to the new serving node, indicating an uplink timing difference determined by the first wireless device, as between the serving node and another node in the network.

7. The method of claim 1, wherein determining the uplink timing difference comprises determining the uplink timing difference as a subframe difference.

8. A first wireless communication device configured for operation in a wireless telecommunication network having a plurality of nodes for serving wireless communication devices, the first wireless communication device comprising:

transceiver circuitry configured to send signaling to the network that initiates handover of the first wireless communication device from a current serving node to a new serving node, and further configured for Device-to-Device (D2D) communication with a second wireless communication device operating in the network; and processing circuitry operatively associated with the transceiver circuitry and configured to:
pause the D2D communication, in response to receiving handover-related signaling from the network, wherein the D2D communication uses uplink resources of the network according to resource scheduling by the network that depends on an uplink timing of the respective node or nodes serving the first and second wireless communication devices;
determine an uplink timing difference between the current and new serving nodes and reporting the uplink timing difference to the network, for use by the network in resuming scheduling of the D2D communication after handover; and
resume the D2D communication after handover, according to resumed scheduling by the network.

9. The first wireless communication device of claim 8, wherein the processing circuitry is configured to send the signaling to the network that initiates handover of the first wireless communication device from the current serving node to the new serving node by sending a measurement report indicating signal measurements made by the first wireless communication device with respect to the serving node and one or more further nodes neighboring the serving node.

10. The first wireless communication device of claim 8, wherein the resource scheduling by the network of the D2D communication is semi-persistent scheduling, and wherein the processing circuitry is configured to pause the D2D communication by pausing the D2D communication on semi-persistently granted resources, in response to receiving an indication from the serving node that the D2D communication should be paused.

11. The first wireless communication device of claim 8, wherein the processing circuitry is configured to determine the uplink timing of the new serving node based on performing a random access procedure with the new serving node.

12. The first wireless communication device of claim 8, wherein the processing circuitry is configured to resume the D2D communication after handover based on receiving a scheduling scheme for the D2D communication from the new serving node, indicating time locations of subframes in which transmission resources may be allocated for the D2D communication, and resuming the D2D communication according to the received scheduling scheme.

13. The first wireless communication device of claim 12, wherein the processing circuitry is configured to transmit a further uplink timing difference to the new serving node, as determined by the first wireless device, as between the serving node and another node in the network.

14. The first wireless communication device of claim 8, wherein the processing circuitry is configured to determine the uplink timing difference as a subframe difference.

* * * * *